US009565502B2

(12) United States Patent
Pontoppidan

(10) Patent No.: US 9,565,502 B2
(45) Date of Patent: Feb. 7, 2017

(54) BINAURAL HEARING ASSISTANCE SYSTEM COMPRISING A DATABASE OF HEAD RELATED TRANSFER FUNCTIONS

(71) Applicant: Oticon A/S, Smørum (DK)

(72) Inventor: Niels Henrik Pontoppidan, Smørum (DK)

(73) Assignee: OTICON A/S, Smorum (DK)

( * ) Notice: Subject to any disclaimer, the term of this patent is extended or adjusted under 35 U.S.C. 154(b) by 0 days.

(21) Appl. No.: 15/204,709

(22) Filed: Jul. 7, 2016

(65) Prior Publication Data

US 2016/0323678 A1      Nov. 3, 2016

Related U.S. Application Data

(62) Division of application No. 14/531,415, filed on Nov. 3, 2014, now Pat. No. 9,414,171.

(30) Foreign Application Priority Data

Nov. 5, 2013   (EP) ..................................... 13191567

(51) Int. Cl.
*H04R 25/00* (2006.01)
*G06F 3/16* (2006.01)
*G06F 3/0486* (2013.01)

(52) U.S. Cl.
CPC ........... *H04R 25/552* (2013.01); *G06F 3/0486* (2013.01); *G06F 3/162* (2013.01);
(Continued)

(58) Field of Classification Search
CPC . H04R 25/552; H04R 25/407; H04R 2225/55; H04R 25/558; G06F 3/162; G06F 3/0486
(Continued)

(56) References Cited

U.S. PATENT DOCUMENTS 8,270,643 B2 * 9/2012 Kjems ................. H04R 25/407
381/26
2004/0218771 A1   11/2004 Chalupper et al.

FOREIGN PATENT DOCUMENTS

EP          2 563 045 A1     2/2013
JP       2006-287878 A      10/2006
(Continued)

*Primary Examiner* — Paul S Kim
(74) *Attorney, Agent, or Firm* — Birch, Stewart, Kolasch & Birch, LLP

(57) ABSTRACT

The application relates to a binaural hearing assistance system comprising left and right hearing assistance devices adapted for being located at or in a left and right ear, respectively, of a user, each of the left and right hearing assistance devices comprising a) an input unit for providing one or more electric input signals based on one or more input sounds of a sound field surrounding the binaural hearing assistance system; b) a source separation unit for separating and localizing one or more sound sources $S_s$ in said sound field relative to the input transducer unit based on said one or more electric input signals, and providing respective separated sound source signals $X_s$, and localization parameters $LP_s$ of said one or more sound sources (s=1, 2, ..., $N_s$); c) an antenna and transceiver unit adapted for allowing an exchange of said electric input signals, and/or said separated sound source signals $X_s$ and/or said localization parameters $LP_s$ of said one or more sound sources between said left and right hearing assistance devices. The application further relates to a method of operating a binaural hearing assistance system. The object of the present application is to provide an improved binaural hearing assistance system. The problem is solved in that the system further comprises d) a comparison and calculation unit for comparing said electric input signals, and/or said separated sound source signals $X_s^l$, $X_s^r$ and/or said localization parameters $LP_s^l$, $LP_s^r$ of said left and right hearing assistance devices, respectively, to estimate a (Continued)

head related transfer function HRTF value for one or more of said sound sources S with said localization parameters $LP_s$ at a given point in time; and e) a memory unit for storing and updating a database of said HRTF values and optionally said localization parameters $LP_s$ over time. This has the advantage of providing a flexible binaural hearing assistance system that is capable of learning the relevant HRTFs of its user, optionally without being initialized. The invention may e.g. be used in hearing aids, headsets, ear phones, active ear protection systems and combinations thereof.

23 Claims, 6 Drawing Sheets

(52) U.S. Cl.
CPC ......... H04R 25/407 (2013.01); H04R 25/558 (2013.01); H04R 2225/55 (2013.01)

(58) Field of Classification Search
USPC .................................. 381/315, 312, 314
See application file for complete search history.

(56) References Cited

FOREIGN PATENT DOCUMENTS

| | | |
|---|---|---|
| WO | WO 2009/001277 A1 | 12/2008 |
| WO | WO 2010/115227 A1 | 10/2010 |

* cited by examiner

BINAURAL HEARING ASSISTANCE SYSTEM COMPRISING A DATABASE OF HEAD RELATED TRANSFER FUNCTIONS

This application is a Divisional of copending application Ser. No. 14/531,415, filed on Nov. 3, 2014, which claims priority under 35 U.S.C. §120. This application claims priority of Application EP 13191567.0 filed in Europe on Nov. 5, 2013, under 35 U.S.C. §119, all of which are hereby expressly incorporated by reference into the present application.

TECHNICAL FIELD

The present application relates to hearing assistance devices, in particular to a binaural hearing assistance system comprising left and right hearing assistance devices adapted for being located at and/or in a left and right ear of a user, respectively, or fully or partially implanted in the head of a user. The disclosure relates specifically to a binaural hearing assistance system configured to build a database of the user's head related transfer functions.

The application furthermore relates to a method of operating a hearing assistance system comprising left and right hearing assistance devices. The application further relates to a data processing system comprising a processor and program code means for causing the processor to perform at least some of the steps of the method.

Embodiments of the disclosure may e.g. be useful in hearing aids, headsets, ear phones, active ear protection systems and combinations thereof.

BACKGROUND

The following account of the prior art relates to one of the areas of application of the present application, hearing aids.

The human ability to spatially localize a sound source is to a large extent dependent on perception of the sound at both ears. Due to different physical distances between the sound source and the left and right ears, a difference in time of arrival of a given wavefront of the sound at the left and right ears is experienced (the Interaural Time Difference, ITD). Consequently, a difference in phase of the sound signal (at a given point in time) will likewise be experienced and in particular perceivable at relatively low frequencies (e.g. below 1500 Hz). Due to the shadowing effect of the head (diffraction), a difference in level of the received sound signal at the left and right ears is likewise experienced (the Interaural Level Difference, ILD). The attenuation by the head (and body) is larger at relatively higher frequencies (e.g. above 1500 Hz). The detection of the cues provided by the ITD and ILD largely determine our ability to localize a sound source in a horizontal plane (i.e. perpendicular to a longitudinal direction of a standing person). The diffraction of sound by the head (and body) is described by the Head Related Transfer Functions (HRTF). The HRTF for the left and right ears ideally describe respective transfer functions from a sound source (from a given direction) to the ear drums of the left and right ears. If correctly determined, the HRTFs provide the relevant ITD and ILD between the left and right ears for a given direction of sound relative to the user's ears. Such $HRTF_{left}$ and $HRTF_{right}$ are preferably applied to a sound signal received by a left and right hearing assistance device in order to improve a user's sound localization ability (cf. e.g. Chapter 14 of [Dillon; 2001]).

Several methods of generating HRTFs are known. Standard HRTFs from a dummy head can e.g. be provided, as e.g. derived from Gardner and Martin's KEMAR HRTF database [Gardner and Martin, 1994] and applied to sound signals received by left and right hearing assistance devices of a specific user. Alternatively, a direct measurement of the user's HRTF, e.g. during a fitting session can—in principle—be performed, and the results thereof be stored in a memory of the respective (left and right) hearing assistance devices. During use, e.g. in case the hearing assistance device is of the Behind The Ear (BTE) type, where the microphone(s) that pick up the sound typically are located near the top of (and often, a little behind) pinna, a direction of impingement of the sound source is determined by each device, and the respective relative HRTFs are applied to the (raw) microphone signal to (re)establish the relevant localization cues in the signal presented to the user.

WO2010115227A1 describes a method and system for allowing a recipient of a bilateral hearing aid system, to locate the source of a sound signal about the recipient using localization cues (e.g. interaural level difference (ILD)) in the sound signal, which are modified (e.g. transposed to a lower frequency) to provide useable localization cues to generate a stimulating signal for application to the recipient.

US2004218771A1 describes a method for producing an approximated partial transfer function for use in an electroacoustic appliance for producing an environment correction transfer function that matches an appliance transfer function for the electroacoustic appliance to an acoustic environment. An environment correction transfer function to standard HRTFs is determined, the correction determining the partial transfer function due to the specific environmental conditions and the particular hearing aid used.

WO2009001277A1 describes a binaural object-oriented audio decoder for providing an enhanced binaural object-oriented audio decoder by modifying the received head-related transfer function parameters according to a received desired distance, which allows an arbitrary virtual positioning of objects in a space.

SUMMARY

In the present disclosure, a binaural fitting is intended to mean a hearing assistance device-pair adapted to be able to exchange data between them, 'data' being audio signals, control signals, and/or other parameters. According to the present disclosure—with a binaural fitting—it is possible to learn the individual Head Related Transfer Functions (HRTF's) from the sources over a given time, which will allow the device to modify the position of nearby sound sources or position virtual sources. With this approach it is possible to skip the measurement (or estimate) of the individual HRTF during hearing instrument fitting. A bilateral fitting, on the other hand, is intended to mean a hearing assistance device-pair adapted for being worn at both ears of a user, but lacking the capability of exchanging data between them.

EP 2 563 045 A1 states that with a binaural fit, it is possible to learn the HRTF's from the sources over a given time. When the HRTF's have been learned it is possible to switch to the bilateral BEE estimation to minimize the inter-instrument communication. With this approach it is possible to skip the measurement of the HRTF during hearing instrument fitting, and minimize the power consumption from inter-instrument communication. Whenever the set of hearing instruments have found that the difference in chosen frequency bands is sufficiently small between the binaural and bilateral estimation for a given spatial location, the instrument can rely on the bilateral estimation method for that spatial location.

An object of the present application is to provide an adaptive and improved binaural hearing assistance system.

Objects of the application are achieved by the invention described in the accompanying claims and as described in the following.

A Binaural Hearing Assistance System:

In an aspect, an object of the application is achieved by a binaural hearing assistance system comprising left and right hearing assistance devices adapted for being located at or in a left and right ear, respectively, of a user (or fully or partially implemented in the head, e.g. at the left and right ear of the user), each of the left and right hearing assistance devices comprising an input unit for providing one or more electric input signals based on one or more input sounds of a sound field surrounding the binaural hearing assistance system;

a source separation unit for separating and localizing one or more sound sources $S_s$ in said sound field relative to the input transducer unit based on said one or more electric input signals, and providing respective separated sound source signals $X_s$, and localization parameters LPs of said one or more sound sources (s=1, 2, . . . , $N_s$);

an antenna and transceiver unit adapted for allowing an exchange of said electric input signals and/or said separated sound source signals Xs and/or said localization parameters LPs of said one or more sound sources between said left and right hearing assistance devices.

Each hearing assistance device further comprises, a comparison and calculation unit for comparing said electric input signals and/or said separated sound source signals $X_s^l$, $X_s^r$ of said left and right hearing assistance devices, respectively, to estimate a head related transfer function HRTF value for one or more of said sound sources S with said localization parameters $LP_s$ at a given point in time; and a memory unit for storing and updating a database of said HRTF values over time.

This has the advantage of providing a flexible binaural hearing assistance system that is capable of learning the relevant HRTFs of its user.

In an embodiment, the database of HRTF values initially comprises standard HRTF-data, e.g. from a dummy head, e.g. derived from Gardner and Martin's KEMAR HRTF database or otherwise measured or estimated HRTF-values. In an embodiment, the database of HRTF values is initially empty (so that the binaural hearing assistance system (without prior knowledge of any HRTF-values) gradually improves and learns the HRTF-values for the particular user of the system).

In an embodiment, the binaural hearing assistance system is configured to provide that said HRTF values are updated according to a criterion or learning rule.

In an embodiment, the HRTF values are relative values (indicative of a relative difference between the head related transfer functions for the right and left ears). In an embodiment, each HRTF values is (or can be) expressed as a complex number (for a given source and location of the source relative the user). In an embodiment, the HRTF value for a given source and location of the source relative the user is a complex number indicative of a relative difference between the head related transfer functions for the right and left ears. In an embodiment, the HRTF-value is expressed as a ratio of the head related transfer functions for the right and left ears, $HRTF = HRTF_r/HRTF_l$.

In an embodiment, the binaural hearing assistance system is configured to provide that a HRTF value is updated when a difference measure ΔHRTF between a currently estimated HRTF value and a corresponding HRTF value stored in the database is larger than a threshold value $\Delta HRTF_{TH}$ (e.g. a complex threshold value, e.g. so that the real and imaginary (or magnitude and phase) parts of the difference measure ΔHRTF are evaluated separately). The difference measure may be based on ratios, or differences of the relevant current and stored HRTF values (or functional values thereof, e.g. logarithmic or absolute value).

Online Learning of HRTF

Given a source signal $S_s$ at a given position $\theta_s$, $\phi_s$, $d_s$ relative to the microphone, the ratio between the corresponding signals that reaches the right and left microphones is $$\frac{X_s^r[n,k]}{X_s^l[n,k]} = \frac{HRTF_r[k, \theta_s, \phi_s, d_s]S_s[n,k]}{HRTF_l[k, \theta_s, \phi_s, d_s]S_s[n,k]} = \frac{HRTF_r[k, \theta_s, \phi_s, d_s]}{HRTF_l[k, \theta_s, \phi_s, d_s]}$$

The ratio can be split into the magnitude part that contains the Interaural Level Difference (ILD) indexed by the position parameters (with its notational short form $A_s$) and the timing part, the Interaural Time Difference (ITD) indexed by the position parameters (with its notational short form $\Theta_s$).

$$ILD[k, \theta_s, \phi_s, d_s] = \frac{|X_s^r[n,k]|}{|X_s^l[n,k]|} = A_s[k]$$

$$ITD[k, \theta_s, \phi_s, d_s] = \frac{\angle\{X_s^r[n,k]\} - \angle\{X_s^l[n,k]\}}{2\pi f(k)} = \Theta_s[k]$$

and thus $$X_s^r[n,k] = A_s[k]X_s^l[n,k]e^{-2\pi j\Theta_s[k]}$$

where $S_s$ source signal and $S_s[n,k]$ source signal in filter bank representation $M^r$ microphone signal at right microphone $X_s^r$ source s signal at right microphone n time index k frequency index s source index $\theta_s$ horizontal angle of incidence for source s $\Phi_s$ vertical angle of incidence for source s $HRTF_r$ head related transfer function for sound originating from $\angle\theta_s$, $\angle\phi_s$, $d_s$ distance of source s (right microphone)

In other words, the relative head related transfer functions HRTF, which reflect the difference between the transfer functions from the sound the source in question ($S_s$) to the right and left ears (microphones) of the user, can be written as the complex number:

$$HRTF[k, \theta_s, \phi_s, d_s] = \frac{HRTF_r[k, \theta_s, \phi_s, d_s]}{HRTF_l[k, \theta_s, \phi_s, d_s]} = \frac{X_s^r[n,k]}{X_s^l[n,k]}$$

$$HRTF[k, \theta_s, \phi_s, d_s] = A_s[k]e^{-2\pi j\Theta_s[k]} = ILD[k, \theta_s, \phi_s, d_s]e^{-2\pi jITD[k,\theta_s,\phi_s,d_s]}$$

According to the present disclosure, the obtained estimates of the transfer function between the two ears ($A_s[k]$ and $\Theta_s[k]$) are continuously compared (e.g. for all values of the time index n; or at predefined points in time, e.g. periodically, e.g. with a predefined frequency) to the (or a) representation of the wearer's individual HRTF in the database for the corresponding or nearest position.

In an embodiment, the system is configured so that whenever the set of hearing instruments (hearing assistance devices) have found that the difference ($A_s[k]$, $\Theta_s[k]$) in chosen frequency bands (k) is greater than the learning threshold $\tau_A$ or $\tau_\Theta$ between stored and the estimated values for the given location ($\theta_s,\phi_s,d_s$), the instrument (hearing assistance device) can update the HRTF database according to a learning rule.

In an embodiment, the learning rule comprises that said HRTF values are updated at a given point in time (and possibly at a given frequency or frequency band) if the deviation exceeds the learning thresholds $\tau_A$ and $\tau_\Theta$, where $\tau_A$ relates to the Interaural Level Difference (ILD) indexed by the position parameters (with its notational short form $A_s$) and where and $\tau_\Theta$, relates to the Interaural Time Difference (ITD) indexed by the position parameters (with its notational short form $\Theta_s$).

In an embodiment, the learning rule is linear with a memory factor $\alpha$, where $0<\alpha<1$.

$$\text{HRTF}_{database}[k,\theta_s,\phi_s,d_s]=\text{HRTF}_{database}[k,\theta_s,\phi_s,d_s](1-\alpha)+\alpha A_s[k]e^{-j\Theta_s[k]}.$$

The learning thresholds $\tau_A$ and $\tau_\Theta$ may furthermore be made frequency dependent (e.g. dependent on frequency index k). In an embodiment, the learning thresholds are different above and below a threshold frequency (e.g. 1500 Hz) and relatively smaller where the difference in question (ITD or ILD) is the more sensitive, and relatively higher where the difference in question (ITD or ILD) is the less sensitive.

In an embodiment, the hearing assistance devices comprise an analogue-to-digital (AD) converter to digitize an analogue input with a predefined sampling rate, e.g. 20 kHz. In an embodiment, the hearing assistance devices comprise a digital-to-analogue (DA) converter to convert a digital signal to an analogue output signal, e.g. for being presented to a user via an output transducer.

In an embodiment, the binaural hearing assistance system comprises a time to time frequency (TF) conversion unit for presenting said one or more time variant electric input signals x(n) in a time-frequency representation X(n,k), where n is a time index and k is a frequency index. In an embodiment, the source separation unit is configured to provide a time-frequency representation $X_s(n,k)$ of said separated sound source signals $X_s$ (and/or said electric input signals)

In an embodiment, each hearing assistance device, e.g. the input unit, comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit (e.g. based on an FFT-, e.g. a DFT-algorithm) for converting a time variant input signal to a (time variant) signal in the frequency domain. In an embodiment, the frequency range considered by the hearing assistance device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, a signal of the forward and/or analysis path of the hearing assistance device is split into a number NI of frequency bands, where NI is e.g. larger than 5, such as larger than 10, such as larger than 50, such as larger than 100, such as larger than 500, at least some of which are processed individually. In an embodiment, the hearing assistance device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the localization parameters $LP_s^l$ and $LP_s^r$ of the left and right hearing assistance device, respectively, of a sound source $S_s$ comprises estimates of coordinates of said sound source relative to an input unit or transducer of the respective left and right hearing assistance device, or relative to the hearing assistance device itself.

In an embodiment, the input unit of a hearing assistance device comprises a number of input transducers, e.g. two or more input transducers. In an embodiment, an input transducer comprises a microphone. In an embodiment, an input transducer comprises a wireless receiver. In an embodiment, an input transducer is adapted for converting an input sound to an electric input signal. In an embodiment, an input transducer comprises a microphone, e.g. a directional or an omni-directional microphone. In an embodiment, the hearing assistance system (e.g. each hearing assistance device, e.g. embodied in the input unit and/or the source separation unit) comprises a directional microphone system adapted to enhance a target acoustic source among a multitude of acoustic sources in the local environment of the user wearing the hearing assistance system. In an embodiment, the directional system is adapted to detect (such as adaptively detect) from which direction (and/or e.g. from which distance) a particular part of the microphone signal (e.g. a particular sound source) originates. This can be achieved in various different ways as e.g. described in the prior art.

In an embodiment, the input unit comprises an antenna and transceiver circuitry for wirelessly receiving a direct electric input signal from another device, e.g. a communication device or another hearing assistance device. In an embodiment, the direct electric input signal represents or comprises an audio signal and/or a control signal and/or an information signal. In an embodiment, the transceiver circuitry comprises demodulation circuitry for demodulating the received direct electric input to provide the direct electric input signal representing an audio signal and/or a control signal. In general, the wireless link established by the antenna and transceiver circuitry of the hearing assistance device can be of any type. In an embodiment, the wireless link is used under power constraints, e.g. in that the hearing assistance device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation (radiated fields (RF)). In an embodiment, the wireless link is based on a standardized or proprietary technology. In an embodiment, the wireless link is based on Bluetooth technology (e.g. Bluetooth Low-Energy technology).

In an embodiment, the localization parameters (e.g. absolute or relative spatial coordinates) of the sound source $S_s$ (s=1, 2, ..., Ns) in the left and right hearing assistance devices are referred to a coordinate system having its center midway between the left and right hearing assistance devices, when operationally mounted on (or implanted in) the user (i.e. typically midway between the ears of the user, cf. e.g. FIG. 1C). In an embodiment, the separated sound source signals $X_s^l$, $X_s^r$ and the corresponding localization parameters $LP_s^l$, $LP_s^r$ of the left and right hearing assistance devices are exchanged between the left and right hearing assistance devices. During learning of HRTF's, similarities (or differences) in the localization parameters determined in each of the hearing assistance devices for a given sound source (as seen from the midpoint between the ears) reveals how much the devices agree (or disagree). For sources in front of the listener, the degree to which the location of such sources coincide (e.g. an absolute or relative deviation between the localization parameters of the left and right hearing assistance devices) represent an estimation of an accuracy measure, which can be used to decide how much an observation should be allowed to update the HRTF database (e.g. determine a weight of the new value in an update algorithm, cf. e.g. parameter a in the learning rule exemplified above).

In an embodiment, some or all of the electric input signals, some or all of the separated sound source signals $X_s^l$, $X_s^r$ and some or all of the localization parameters are exchanged between the left and right hearing assistance devices (i.e. the localization parameters are not exchanged).

In an embodiment (e.g. in a specific first mode of operation), only the separated sound source signals $X_s^l$, $X_s^r$ are exchanged between the left and right hearing assistance devices (i.e. the localization parameters are not exchanged).

In an embodiment (e.g. in a specific second mode of operation), only the localization parameters $LP_s^l$, $LP_s^r$ are exchanged between the left and right hearing assistance devices (i.e. the separated sound source signals are not exchanged). During use of the learned HRTF, exchange of the localization parameters requires less bandwidth than exchange of separated audio signals.

In an embodiment (e.g. in a specific third mode of operation), the separated sound source signals as well as the corresponding localization parameters are exchanged between the left and right hearing assistance devices.

In an embodiment (e.g. in a specific fourth mode of operation), sound source signals for selected sources and/or localization parameters of the same and/or other sound sources are exchanged between the left and right hearing assistance devices.

In an embodiment, the left and right hearing assistance devices are configured to enable access to the HRTF-database of the respective other hearing assistance device and to import said electric input signals, and/or separated sound source signals and/or localization parameters for said sources from the other (opposite) hearing assistance device. This allows e.g. the hearing assistance devices to probe each other about currently dominant sound sources and/or their spatial directions.

Exchanging the localization parameters, and including both entries (of the left and right devise) in the HRTF tables of each hearing assistance device has the potential advantage of improving the HRTF-accuracy.

Applying a HRTF to a Signal

In an embodiment, each of the left and right hearing assistance devices comprises an HRTF-control unit for applying a HRTF-value to at least one of said separated sound source signals (and/or to at least one of the electric input signals). The HRTF value is preferably selected from the database of HRTF values corresponding the location of the separated sound source in question.

The transfer functions in the HRTF database may, alternatively or additionally, be applied to sound signals $X_e$ received through other channels than the microphones (e.g. via a wireless receiver), e.g. by streaming, Direct Audio Input (DAI), telecoil, etc., i.e. signals that have not been exposed to the physical HRTF of the wearer.

In an embodiment, at least one of the left and right hearing assistance devices comprises an audio input for receiving a direct electric input signal representing a sound source signal of a real or virtual sound source, and where said at least one of the left and right hearing assistance devices is configured to estimate a location of a real or virtual sound source and to apply a corresponding HRTF from the database to said direct electric input signal.

Given that the signal $X_e$ is to be placed at position $(\theta_e, \phi_e, d_e)$ the corresponding device signals can be written as $$Y_e^r[n, k] = \frac{HRTF_{database}[k, \theta_e, \phi_e, d_e]}{2} X_e[n, k]$$

$$Y_e^l[n, k] = \frac{2}{HRTF_{database}[k, \theta_e, \phi_e, d_e]} X_e[n, k]$$

In other words, the relative HRTF accounts for the difference between the sound from a given source $S_e$ at the right and left ears. This 'difference' can then be applied to a signal without directional cues ($X_e$ e.g. a directly received electric signal, e.g. a streamed signal). Thereby the time and level differences normally accounted for by the different locations of the ears relative to the sound source and to the shadowing effect of the human head (etc.) can be applied to a signal ($X_e$) without directional cues (to thereby e.g. virtually 'placing' a directly received electric signal in the environment around the user).

For a multi channel input signal $X_E$, each channel can be considered as a sum of individual signals $X_{e1-eM}$ with individual position in the two equations above, i.e.

$$Y_E^r[n,k] = \Sigma_{e'=1:M} Y_{e'}^r[n,k].$$

In an embodiment, the localization parameters comprise (or is constituted by) a direction (e.g. from the input unit or transducer or hearing assistance device in question) to the real or virtual sound source. In an embodiment, the sound represented by the direct electric input is a single channel sound (mono), or alternatively a multichannel sound where each channel has its own position. In an embodiment, the binaural hearing assistance system is configured to estimate the position of the sound source from the direction to the origin of the sound source (or direct electric signal). In an embodiment, the binaural hearing assistance system is configured to exchange localization data of (e.g. the position of and/or direction to) the sound source between the two hearing assistance devices.

In an embodiment, each of the left and right hearing assistance devices comprises a signal processing unit for processing an input signal selected among said electric input signals, and/or said separated sound source signals or a mixture thereof. In an embodiment, the hearing assistance device is adapted to provide a frequency dependent gain to compensate for a hearing loss of a user. In an embodiment, the hearing assistance device comprises a signal processing unit for enhancing the input signals and providing a processed output signal. Various aspects of digital hearing aids are described in [Schaub; 2008].

In an embodiment, at least one of (such as each of) the left and right hearing assistance devices comprises an output unit for providing output stimuli to the user based on a processed signal, wherein said output stimuli are perceived by the user as sound. In an embodiment, the output unit comprises an output transducer for converting an electric signal to a stimulus perceived by the user as an acoustic signal. In an embodiment, the output unit comprises a number of electrodes of a cochlear implant or a vibrator of a bone conducting hearing assistance device. In an embodiment, the output transducer comprises a receiver (speaker) for providing the stimulus as an acoustic signal to the user.

In an embodiment, each of the left and right hearing assistance devices comprises a forward signal path between said input and output units, the forward path comprising a signal processing unit operatively connected to an output of the input unit and an input of the output unit, the signal processing unit being configured to apply a processing algorithm to an input signal and provide a processed output signal. In an embodiment, each of the left and right hearing assistance devices comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

Manipulating the Position of a Signal

In an embodiment, the binaural hearing assistance system comprises a user interface (e.g. a remote control, e.g. implemented as an APP of a SmartPhone) from which a user can select a suitable position, e.g. by 'placing' a sound source in the current acoustic environment (e.g. via a graphical interface illustrating currently active (real or virtual, e.g. directly received sound signals) sound source(s) relative to the user). In an embodiment, the binaural hearing assistance system is configured to update localization parameters of a sound source in the memory unit of the left and right hearing assistance devices, based on inputs from a user interface. In an embodiment, the binaural hearing assistance system is configured to allow a user to select a particular sound source signal to be included in the output signal to the user via the user interface.

The HRTF database also allows for manipulation of the perceived position of sounds that have been affected by the wearer's HRTF. Modifying the perceived location of a signal is a two step procedure where the resulting signals $Y_e^{lr}$ undergo a compensation for the HRTF corresponding to the signal's physical position and application of the HRTF corresponding to the chosen perceived position. For instance, this allows device-pairs to increase the perceived distance between concurrent sounds.

$$Y_e^r[n,k] = \frac{HRTF_{database}[k, \theta_e, \phi_e, d_e]}{HRTF_{database}[k, \theta_s, \phi_s, d_s]} X_s^r[n,k]$$

$$Y_e^l[n,k] = \frac{HRTF_{database}[k, \theta_s, \phi_s, d_s]}{HRTF_{database}[k, \theta_e, \phi_e, d_e]} X_s^l[n,k]$$

In an embodiment, the binaural hearing assistance system comprises an auxiliary device (e.g. a remote control, e.g. a cellphone, e.g. a SmartPhone) wherein the user interface is implemented.

In an embodiment, the system is adapted to establish a communication link between the hearing assistance device(s) and the auxiliary device to provide that information (e.g. control and status signals, possibly audio signals) can be exchanged or forwarded from one to the other.

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing assistance device. In an embodiment, the auxiliary device is or comprises a remote control for controlling functionality and operation of the hearing assistance device(s). In an embodiment, the auxiliary device is or comprises a cellphone, e.g. a SmartPhone. In an embodiment, processing of the system (e.g. sound source separation) and/or the function of a remote control is fully or partially implemented in a SmartPhone, the SmartPhone possibly running an APP allowing to control the functionality of the audio processing device via the SmartPhone and/or to provide a user interface (the hearing assistance device(s) comprising an appropriate wireless interface to the SmartPhone, e.g. based on Bluetooth or some other standardized or proprietary scheme).

In the present context, a SmartPhone is a portable electronic device that may comprise
- a (A) cellular telephone comprising a microphone, a speaker, and a (wireless) interface to the public switched telephone network (PSTN) COMBINED with
- a (B) personal computer comprising a processor, a memory, an operative system (OS), a user interface (e.g. a keyboard and display, e.g. integrated in a touch sensitive display) and a wireless data interface (including a Web-browser), allowing a user to download and execute application programs (APPs) implementing specific functional features (e.g. displaying information retrieved from the Internet, remotely controlling another device, combining information from various sensors of the SmartPhone (e.g. camera, scanner, GPS, microphone, etc.) and/or external sensors to provide special features, etc.).

In an embodiment, the binaural hearing assistance system is configured to allow a user to modify a location of a sound source whose location has been determined by the source separation unit (or received separately for a wirelessly received direct electric signal) via the user interface and to apply the HRTF values to the sound source signal, the HRTF values being extracted from the HRTF database corresponding to the modified location of the sound source. Thereby, the user is allowed to manipulate the sound field by placing one or more sound sources at another position than its/their physical (or otherwise proposed) location. In an embodiment, the sound signal from the sound source whose location has been modified via the user interface represents a single channel sound (mono) or a multichannel sound where each channel has its own position.

In an embodiment, the binaural hearing assistance system comprises a localization unit (e.g. embodied in at least one of, such as each of, the hearing assistance devices, or in an auxiliary device) where the position of the sound source is estimated by other means than the sound signal, i.e. by an independent localization unit in the device-pair, including outputs from the wireless/radio communication etc. In an embodiment, the binaural hearing assistance system comprises a localization extracting unit (e.g. embodied in at least one of, such as each of, the hearing assistance devices, or in an auxiliary device) configured to extract localization parameters intended for representing the perceived location of a specific sound. In an embodiment, the binaural hearing assistance system comprises an antenna and transceiver unit for receiving a signal comprising the localization parameters. In an embodiment, the localization extracting unit is configured to extract localization parameters embedded in an audio signal representing a sound source signal. In an embodiment, at least one of the hearing assistance devices comprise a localization extracting unit.

Detectors:

In an embodiment, the binaural hearing assistance system (e.g. one of the hearing assistance devices or an auxiliary device) comprises one or more detectors, e.g. configured to provide signals relating to a current property of 'the physical environment' of the hearing assistance system, e.g. to provide parameters of the acoustic environment.

In an embodiment, the hearing assistance device comprises a level detector (LD) for determining the level of an input signal (e.g. on a band level and/or of the full (wide band) signal). The input level of the electric microphone signal picked up from the user's acoustic environment is e.g. a classifier of the environment.

In a particular embodiment, the hearing assistance device comprises a voice activity detector (VAD) for determining whether or not an input signal comprises a voice signal (at a given point in time). This has the advantage that time segments of the electric microphone signal comprising human utterances (e.g. speech) in the user's environment can be identified, and thus separated from time segments only comprising other sound sources (e.g. artificially generated noise). In an embodiment, the voice detector is adapted to detect as a VOICE also the user's own voice. Alternatively, the voice detector is adapted to exclude a user's own voice from the detection of a VOICE. In an embodiment, the hearing assistance system is configured to identify the sound sources that comprise speech (and e.g.—in a particular speech mode—exclude sources that are not identified as (currently) comprising speech).

In a particular embodiment, the hearing assistance device comprises a feedback detector (e.g. a tone detector in combination with a discriminator of whether a detected tone is due to feedback or not). In a particular embodiment, the hearing assistance device comprises a detector of music, e.g. based on the feedback detector).

Other Functionality:

In an embodiment, the hearing assistance device comprises an acoustic (and/or mechanical) feedback suppression system. In an embodiment, the hearing assistance device further comprises other relevant functionality for the application in question, e.g. compression, noise reduction, etc.

In an embodiment, the hearing assistance device comprises a listening device, e.g. a hearing aid, e.g. a hearing instrument, e.g. a hearing instrument adapted for being located at the ear or fully or partially in the ear canal of a user or for being fully or partially implanted in a user's head, or a headset, an earphone, an ear protection device or a combination thereof.

Use:

In an aspect, use of a binaural hearing assistance system as described above, in the 'detailed description of embodiments' and in the claims, is moreover provided. In an embodiment, use is provided in a system comprising one or more hearing instruments, headsets, ear phones, active ear protection systems, etc., e.g. in handsfree telephone systems, teleconferencing systems, public address systems, karaoke systems, classroom amplification systems, etc.

A Method:

In an aspect, a method of operating a binaural hearing assistance system comprising left and right hearing assistance devices is furthermore provided, the method comprising in each of the left and right hearing assistance devices:
providing one or more electric input signals based on one or more input sounds of a sound field surrounding the binaural hearing assistance system;
separating and localizing one or more sound sources $S_s$ in said sound field relative to the input transducer unit based on said one or more electric input signals, and providing respective separated sound source signals $X_s$, and localization parameters $LP_s$ of said one or more sound sources (s=1, 2, . . . , $N_s$);
exchanging of said electric input signals, and/or said separated sound source signals $X_s$ and/or said localization parameters $LP_s$ of said one or more sound sources between said left and right hearing assistance devices;
comparing said electric input signals, and/or said separated sound source signals $X_s^l$, $X_s^r$ and/or said localization parameters $LP_s^l$, $LP_s^r$ of said left and right hearing assistance devices, respectively, to estimate a head related transfer function HRTF value for one or more of said sound sources S with said localization parameters $LP_s$ at a given point in time; and
storing and updating a database of said HRTF values and optionally said localization parameters $LP_s$ over time.

It is intended that some or all of the structural features of the system described above, in the 'detailed description of embodiments' or in the claims can be combined with embodiments of the method, when appropriately substituted by a corresponding process and vice versa. Embodiments of the method have the same advantages as the corresponding system.

In an embodiment, the method provides that said HRTF values are updated according to a criterion or learning rule. In an embodiment, the method comprises initially storing standard HRTF-data in the database, e.g. from a dummy head, e.g. derived from Gardner and Martin's KEMAR HRTF database. During use of the binaural hearing assistance system, the initially stored HRTF-data (e.g. standard data) are substituted by improved (customized, learned) HRTF-data.

In an embodiment, the method provides that said criterion or learning rule comprises that a HRTF value is updated when a difference measure $\Delta HRTF$ between a currently estimated HRTF value and a corresponding HRTF value stored in the database is larger than a threshold value $\Delta HRTF_{TH}$. In an embodiment, the method provides that said criterion or learning rule comprises that said HRTF values are updated at a given point in time, and optionally at a given frequency or frequency band, if the deviation between stored and current values of Interaural Level Difference (ILD) and Interaural Time Difference (ITD), both being indexed by the position parameters of the sound source in question, exceeds learning thresholds $\tau_A$ and $\tau_\Theta$, where $\tau_A$ relates to ILD and where and $\tau_\Theta$, relates ITD.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application. In addition to being stored on a tangible medium such as diskettes, CD-ROM-, DVD-, or hard disk media, or any other machine readable medium, and used when read directly from such tangible media, the computer program can also be transmitted via a transmission medium such as a wired or wireless link or a network, e.g. the Internet, and loaded into a data processing system for being executed at a location different from that of the tangible medium.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

DEFINITIONS

In the present context, a 'hearing assistance device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing assistance device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing assistance device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing assistance device may comprise a single unit or several units communicating electronically with each other.

More generally, a hearing assistance device comprises an input transducer for receiving an acoustic signal from a user's surroundings and providing a corresponding input audio signal and/or a receiver for electronically (i.e. wired or wirelessly) receiving an input audio signal, a signal processing circuit for processing the input audio signal and an output means for providing an audible signal to the user in dependence on the processed audio signal. In some hearing assistance devices, an amplifier may constitute the signal processing circuit. In some hearing assistance devices, the output means may comprise an output transducer, such as e.g. a loudspeaker for providing an air-borne acoustic signal or a vibrator for providing a structure-borne or liquid-borne acoustic signal. In some hearing assistance devices, the output means may comprise one or more output electrodes for providing electric signals.

In some hearing assistance devices, the vibrator may be adapted to provide a structure-borne acoustic signal transcutaneously or percutaneously to the skull bone. In some hearing assistance devices, the vibrator may be implanted in the middle ear and/or in the inner ear. In some hearing assistance devices, the vibrator may be adapted to provide a structure-borne acoustic signal to a middle-ear bone and/or to the cochlea. In some hearing assistance devices, the vibrator may be adapted to provide a liquid-borne acoustic signal to the cochlear liquid, e.g. through the oval window. In some hearing assistance devices, the output electrodes may be implanted in the cochlea or on the inside of the skull bone and may be adapted to provide the electric signals to the hair cells of the cochlea, to one or more hearing nerves, to the auditory cortex and/or to other parts of the cerebral cortex.

A 'listening system' refers to a system comprising one or two hearing assistance devices, and a 'binaural listening system' refers to a system comprising one or two hearing assistance devices and being adapted to cooperatively provide audible signals to both of the user's ears. Listening systems or binaural listening systems may further comprise 'auxiliary devices', which communicate with the hearing assistance devices and affect and/or benefit from the function of the hearing assistance devices. Auxiliary devices may be e.g. remote controls, audio gateway devices, mobile phones, public-address systems, car audio systems or music players. Hearing assistance devices, listening systems or binaural listening systems may e.g. be used for compensating for a hearing-impaired person's loss of hearing capability, augmenting or protecting a normal-hearing person's hearing capability and/or conveying electronic audio signals to a person.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

FIG. 1 schematically illustrates various examples of a mutual location in space of elements of a binaural hearing assistance system and/or a sound source, represented in a spherical and an orthogonal coordinate system.

Figure 1A:
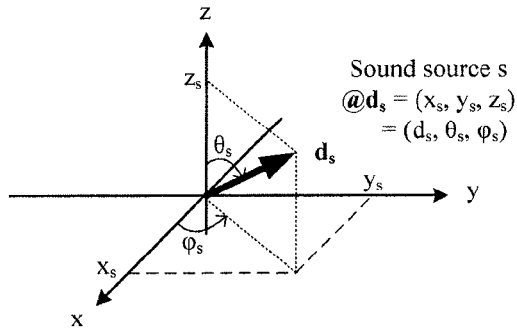
FIGS. 1A-FIG. 1D schematically illustrate various examples of a mutual location in space of elements of a binaural hearing assistance system and/or a sound source, represented in a spherical and an orthogonal coordinate system.

FIG. 1A defines coordinates of a spherical coordinate system $(d, \theta, \phi)$ in an orthogonal coordinate system $(x, y, z)$. A given point in three dimensional space (here illustrated by a location of sound source $S_s$) whose location is represented by a vector $d_s$ from the center of the coordinate system $(0, 0, 0)$ to the location $(x_s, y_s, z_s)$ of the sound source $S_s$ in the orthogonal coordinate system is represented by spherical coordinates $(d_s, \theta_s, \phi_s)$, where $d_s$, is the radial distance to the sound source $S_s$, $\theta_s$ is the (polar) angle from the z-axis of the orthogonal coordinate system $(x, y, z)$ to the vector $d_s$, and $\phi_s$, is the (azimuth) angle from the x-axis to a projection of the vector $d_s$ in the xy-plane of the orthogonal coordinate system.

Figure 1B:
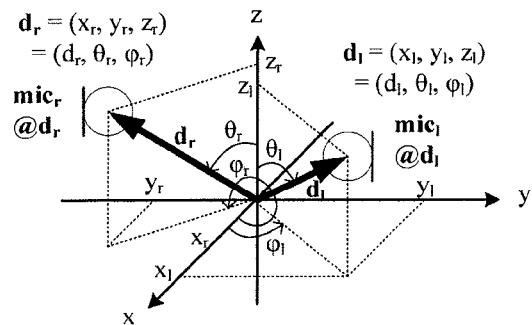
Figure 1C:
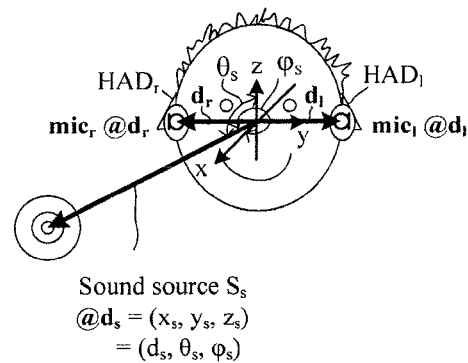
Figure 1D:
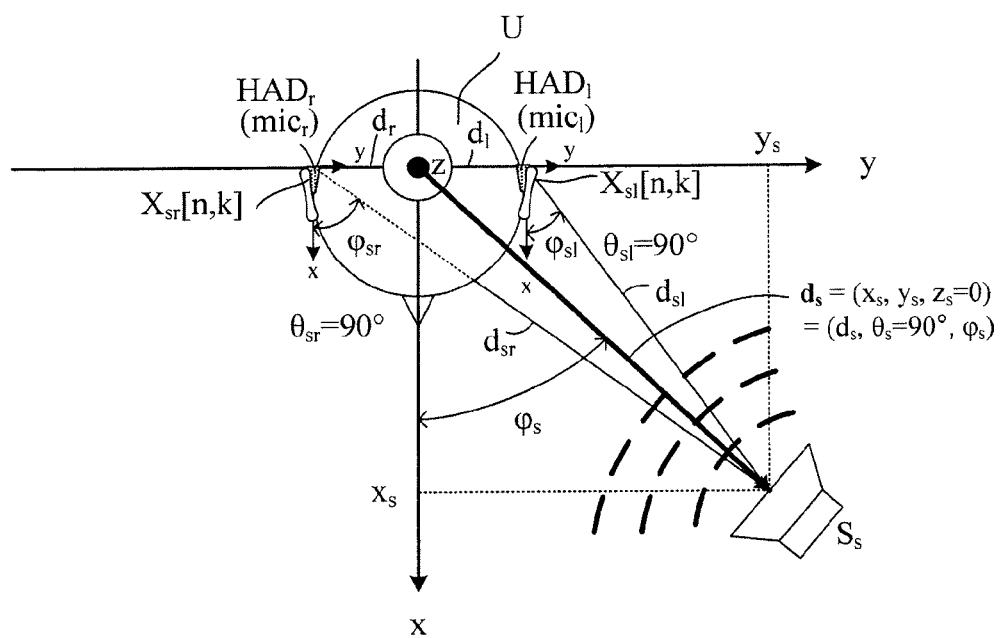

FIG. 1B defines the location of left and right hearing assistance devices $HAD_l$, $HAD_r$ (see FIG. 1C, 1D, here represented by left and right microphones $mic_l$, $mic_r$) in orthogonal and spherical coordinates, respectively. The center $(0, 0, 0)$ of the coordinate systems can in principle be located anywhere, but is here (to utilize the symmetry of the setup) assumed to be located midway between the location of the centers of the left and right microphones $mic_l$, $mic_r$, as illustrated in FIG. 1C, 1D. The location of the left and right microphones $mic_l$, $mic_r$ are defined by respective vectors $d_l$ and $d_r$, which can be represented by respective sets of rectangular and spherical coordinates $(x_l, y_l, z_l), (d_l, \theta_l, \phi_l)$ and $(x_r, y_r, z_r), (d_r, \theta_r, \phi_r)$.

FIG. 1C defines the location of left and right hearing assistance devices $HAD_l$, $HAD_r$ (here represented by left and right microphones $mic_l$, $mic_r$) relative to a sound source $S_s$ in orthogonal and spherical coordinates, respectively. The center $(0, 0, 0)$ of the coordinate systems is assumed to be located midway between the location of the centers of the left and right microphones $mic_l$, $mic_r$. The location of the left and right microphones $mic_l$, $mic_r$ are defined by vectors $d_l$ and $d_r$, respectively. The location of the sound source $S_s$ is defined by vector $d_s$ and orthogonal and spherical coordinates $(x_s, y_s, z_s)$ and $(d_s, \theta_s, \phi_s)$, respectively. The sound source $S_s$ may e.g. illustrate a person speaking (or otherwise expressing him or herself), a loudspeaker playing sound, or a wireless transmitter transmitting an audio signal to a wireless receiver of one or both of the hearing assistance devices.

FIG. 1D defines a similar setup as shown in FIG. 1C. FIG. 1D illustrates a user U equipped with left and right hearing assistance devices $HAD_l$, $HAD_r$ and a sound source $S_s$ (e.g. a loudspeaker, as shown, or a person speaking) located in front, to the left of the user. Left and right microphones $mic_l$, $mic_r$ of the left and right hearing assistance devices $HAD_l$, $HAD_r$ received time variant sound signals sound source $S_s$. The sound signals are received by the respective microphones and converted electric input signals and provided in a time frequency representation in the form of (complex) digital signals $X_{sl}[n,k]$ and $X_{sr}[n,k]$ in the left and right hearing assistance devices $HAD_l$, $HAD_r$ (see also FIG. 3B), n being a time index and k being a frequency index. The directions of propagation of the sound wave-fronts from the sound source $S_s$ to the respective left and right microphones $mic_l$, $mic_r$ are indicated by lines (vectors) $d_{sl}$ and $d_{sr}$, respectively. The center $(0, 0, 0)$ of the orthogonal coordinate system $(x, y, z)$ is located midway between the left and right hearing assistance devices $HAD_l$, $HAD_r$, which are assumed to lie in the xy-plane $(z=0, \theta=90°)$ together with the sound source $S_s$. The different distances, $d_{sl}$ and $d_{sr}$, from the sound source $S_s$ to the left and right hearing assistance devices $HAD_l$, $HAD_r$, respectively, account for different times of arrival of a given sound wave-front at the two microphones $mic_l$, $mic_r$, hence resulting in an ITD($d_s$, $\theta_s$, $\phi_s$). Likewise the different constitution of the propagation paths (the path to the right hearing assistance device $HAD_r$ is influenced by the users' head (as indicated by the dotted line segment of the vector $d_{sr}$), the path to the left hearing assistance device $HAD_l$ is NOT) gives rise to different levels of the received signals at the two microphones $mic_l$, $mic_r$. In other words an ILD($d_s$, $\theta_s$, $\phi_s$) is observed. These differences (that are perceived by a normally hearing person as localization cues) are to a certain extent (depending on the actual location of the microphones on the hearing assistance device) reflected in the signals $X_{sl}[n,k]$ and $X_{sr}[n,k]$ and can be used to extract the head related transfer functions for the given geometrical scenario point source located at $(d_s, \theta_s, \phi_s)$.

Figure 2:
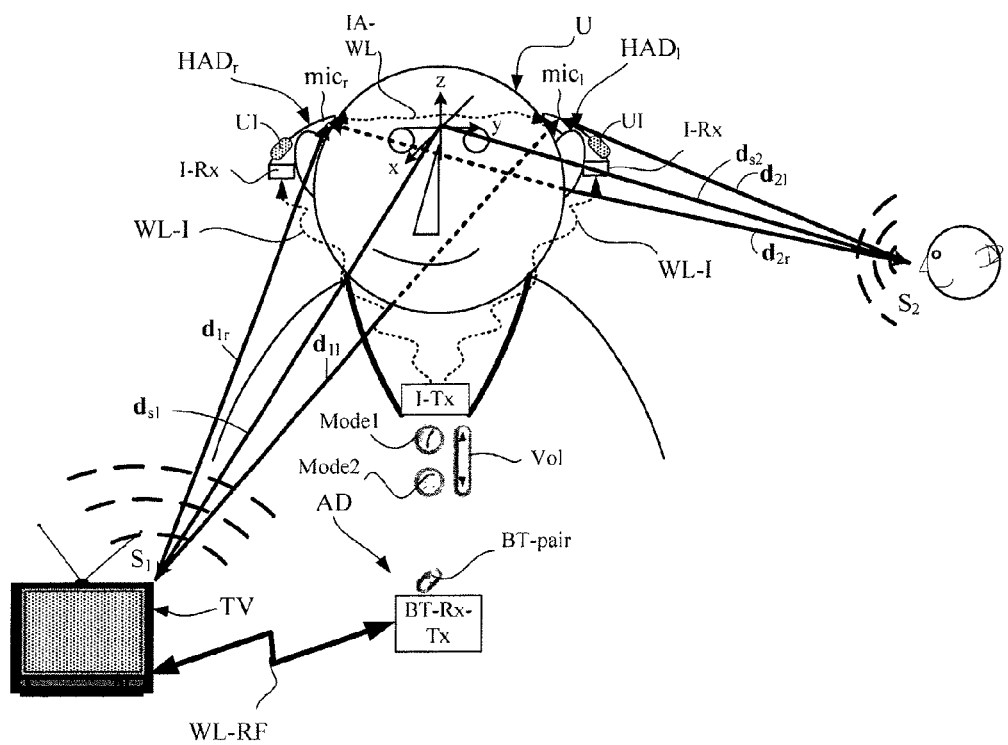
FIG. 2 shows an embodiment of a binaural hearing assistance system comprising left and right hearing assistance devices and an auxiliary device, e.g. an audio gateway, the system being adapted for establishing a first (interaural) communication link between the two hearing assistance devices as well as for establishing a communication link between each or the two hearing assistance devices and the auxiliary device, FIG. 3A.

FIG. 2 shows an embodiment of a binaural hearing assistance system comprising left and right hearing assistance devices $HAD_l$, $HAD_r$, and an auxiliary device AD, e.g. an audio gateway, the system being adapted for establishing a first (interaural) communication link IA-WL between the two hearing assistance devices as well as for establishing a communication link WL-I between each or the two hearing assistance devices and the auxiliary device. FIG. 2 shows an application scenario of an embodiment of a binaural hearing assistance system according to the present disclosure, wherein the auxiliary device (AD) comprises an audio gateway device, e.g. adapted for receiving a multitude of audio signals from different sound sources (here only one source $S_1$, entertainment device (TV), is shown). Alternatively inputs from other acoustic and/or wirelessly transmitted audio sources, e.g. from a telephone apparatus, e.g. a mobile telephone, from a computer, e.g. a PC, or from an external microphone (e.g. based on FM or Bluetooth transmission) for picking up sounds from the environment, e.g. the voice of another person, can be received by the auxiliary device (and/or one or both of the hearing assistance devices). The audio signals from sound source $S_1$ are wirelessly transmitted to the left and right hearing assistance devices $HAD_l$, $HAD_r$ (via the auxiliary device and links WL-RF and WL-I) AS WELL AS acoustically propagated by a loudspeaker of the entertainment device TV. A further audio source $S_2$ in the form of a person speaking thereby creating sound source signals which are received at the left and right hearing assistance devices $HAD_l$, $HAD_r$. The geometric arrangement of the sound sources $S_1$ and $S_2$ relative to the left and right hearing assistance devices $HAD_l$, $HAD_r$ are illustrated with their different distance and propagation paths relative to the user's head as explained in FIG. 1D. The two sound sources $S_1$ and $S_2$ are represented in the xyz-coordinate system by vectors $d_{s1}$ and $d_{s2}$, respectively. The propagation paths of the wave fronts of the acoustic signals of the two sound sources $S_1$ and $S_2$ are represented in the xyz-coordinate system by vector sets ($d_{1l}$, $d_{1r}$) and ($d_{2l}$, $d_{2r}$), respectively, where, as in FIG. 1D, the parts of the paths that are influenced by head diffraction are indicated in dotted line.

The auxiliary device AD is adapted to be connected to the (different) sound source(s) via wireless links WL-RF, here in the form of digital transmission link(s) according to the Bluetooth standard as indicated by the Bluetooth transceiver (BT-Rx-Tx) in the audio gateway device (AD). The audio sources and the audio gateway device may be paired using the button BT-pair on the auxiliary device. Once paired, the BT-address of the audio source may be stored in a memory of the audio gateway device for easy future pairing. The links to the audio sources may alternatively or additionally be implemented in any other convenient wireless and/or wired manner, and according to any appropriate modulation type or transmission standard, possibly different for different audio sources. The auxiliary device may function as a remote control of the binaural hearing assistance system. The intended mode of operation of the system can e.g. be selected by the user U via mode selection buttons Mode1 and Mode2. The auxiliary device AD may further have the function of allowing a user to the change the currently active program (e.g. telephone program, TV-listening program, normal conversation program, etc.) or changing operating parameters (e.g. volume, cf. Vol-button) in the hearing assistance devices, and/or for fully or partially powering the system down (or up).

In the embodiment of FIG. 2, the left and right hearing assistance devices ($HAD_l$, $HAD_r$) each additionally comprises a manually operable user interface (UI), whereby the user is allowed to change operating conditions of each individual (or both) hearing instruments by manual operation of the user interface (e.g. a push button), e.g. for changing program or operating parameters (e.g. volume) or for powering the devices (fully or partially) down or up (i.e. turning devices on or off).

The left and right hearing assistance devices ($HAD_l$, $HAD_r$) are shown as devices mounted at the left and right ears of a user (U). The hearing assistance devices of the system of FIG. 2 each comprises a wireless transceiver, here indicated to be based on inductive communication (I-Rx). The transceiver (at least) comprises an inductive receiver (i.e. an inductive coil, which is inductively coupled to a corresponding coil in a transceiver (I-Tx) of the audio gateway device (AD)), which is adapted to receive the audio signal from the audio gateway device (either as a baseband signal or as a modulated (analogue or digital) signal, and in the latter case to extract the audio signal from the modulated signal). The inductive links WL-I between the auxiliary device AD and each of the hearing instruments are indicated to be one-way, but may alternatively be two-way (e.g. to be able to exchange control signals between transmitting (AD) and receiving ($HAD_l$, $HAD_r$) device, e.g. to agree on an appropriate transmission channel, or to exchange other signals or parameters, e.g. audio signals or localization parameters). Alternatively or additionally, the hearing assistance device(s) may be adapted to receive one or more audio signals directly transmitted to the hearing assistance device(s) from other sound sources in the environment. The left and right hearing assistance devices may e.g. be embodied in respective left and right hearing instruments, each comprising a BTE-part (adapted for being located Behind The Ear (BTE) of the user) as shown in FIG. 2. Each of the left and right hearing instrument may comprise one or more microphones ($mic_l$ and $mic_r$, respectively). One or both of the hearing instruments may e.g. be adapted to compensate for a hearing impairment of the user. Alternatively, the left and right hearing assistance devices may comprise ear pieces for augmenting an acoustic and/or wirelessly received (possibly virtual) sound field 'surrounding' the user U. The user U may be normally hearing or hearing impaired.

The auxiliary device (AD) is shown to be carried around the neck of the user (U) in a neck-strap. The neck-strap may have the combined function of a carrying strap and a loop antenna into which the audio signal from the auxiliary device is fed (directly by galvanic connection, or indirectly via an inductive coupling to a transmitting coil in the auxiliary device) for better inductive coupling to the inductive transceiver of the listening device. Alternatively, the auxiliary device AD may be carried by the user U in any other way, e.g. held in a hand.

Figure 3A:
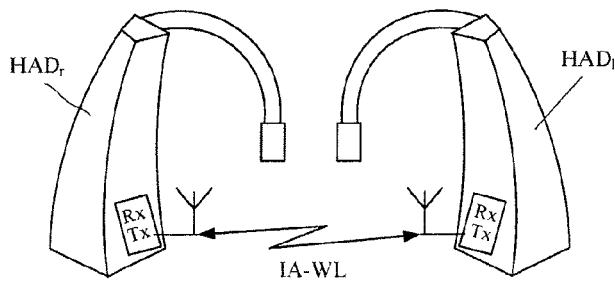
-FIG. 3B show an embodiment of a binaural hearing assistance system comprising left and right hearing assistance devices.
Figure 3B:
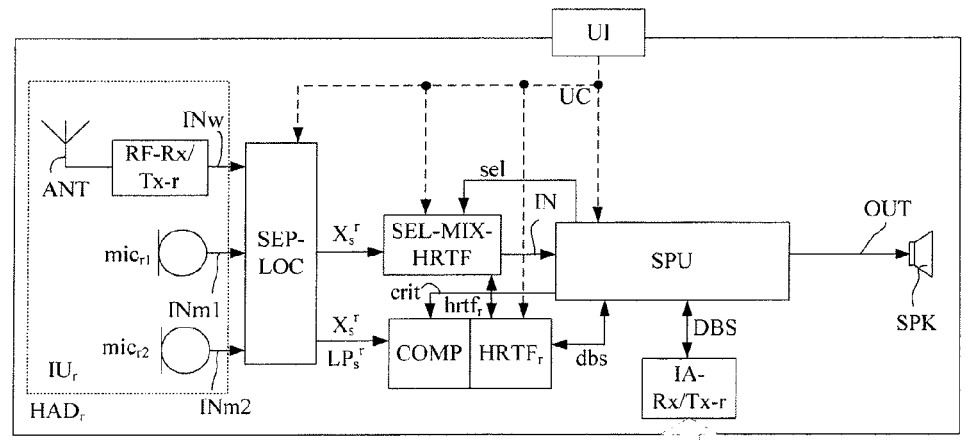
Figure 3B:
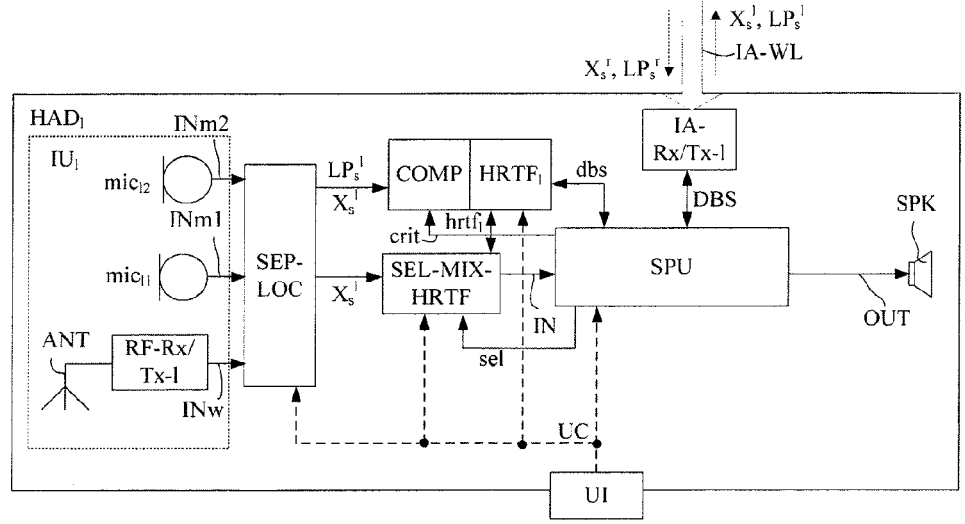

FIG. 3 shows an embodiment of a binaural hearing assistance system comprising first and second hearing assistance devices.

FIG. 3A shows an example of a binaural or a bilateral listening system comprising first and second hearing assistance devices $HAD_l$, $HAD_r$, each being e.g. a hearing assistance device as illustrated in FIG. 3B. The hearing assistance devices are adapted to exchange information via wireless link IA-WL and transceivers RxTx. The information that can be exchanged between the two hearing assistance devices comprises e.g. information (e.g. sound source localization information or HRTFs), control signals and/or audio signals (e.g. one or more (e.g. all) frequency bands of one or more audio signals). The first and second hearing assistance devices $HAD_l$, $HAD_r$ of FIG. 1A are shown as BTE-type device, each comprising a housing adapted for being located behind an ear (pinna) of a user, the hearing assistance devices each comprising one or more microphones, a signal processing unit and an output unit (e.g. a loudspeaker). In an embodiment, all of these components are located in the housing of the BTE-part. In such case the sound from the output transducer may be propagated to the ear canal of the user via a tube connected to a loudspeaker outlet of the BTE-part. The tube may be connected to an ear mould specifically adapted to the form of the users' ear canal and allowing sound signals from the loudspeaker to reach the ear drum of the ear in question. In an embodiment, the ear mould or other part located in or near the ear canal of the user comprises a microphone (e.g. located at the entrance to ear canal) which form part of the input unit of the corresponding hearing assistance device and thus may constitute one of the electric input signals that are used to separate the sound sources $S_s$ in the environment from each other. Alternatively, the output transducer may be located separately from the BTE-part, e.g. in the ear canal of the user, and electrically connected to the signal processing unit of the BTE-part (e.g. via electric conductors or a wireless link).

FIG. 3B shows an embodiment of a binaural or a bilateral hearing assistance system, e.g. a hearing aid system, comprising left and right hearing assistance devices ($HAD_l$, $HAD_r$), in the following termed hearing instruments. The left and right hearing instruments are adapted for being located at or in left and right ears of a user. The hearing instruments are adapted for exchanging information between them via a wireless communication link, here via a specific inter-aural (IA) wireless link (IA-WL) implemented by corresponding antenna and transceiver circuitry (IA-Rx/Tx-l and IA-Rx/Tx-r). of the left and right hearing instruments, respectively). The two hearing instruments ($HAD_l$, $HAD_r$) are adapted to allow the exchange of audio source signals $X_s$ and localization parameters $LP_s$ of the corresponding source signals $S_s$ between the two hearing instruments, cf. dotted arrows indicating a transfer of signals $X_s^r$, $LP_s^r$ from the right to the left instrument and signals $X_s^l$, $LP_s^l$ from the left to the right instruments. Each hearing instrument ($HAD_l$, $HAD_r$) comprise a forward signal path comprising an input unit ($IU_l$, $IU_r$) operatively connected to a signal processing unit (SPU) and an output unit (here loudspeaker (SPK)). Between the input unit IU and the signal processing unit SPU, and in operative connection with both, a source separation and localization unit (SEP-LOC) is located. The source separation and localization unit (SEP-LOC) is adapted to provide separated sound source signals ($X_s^l$, $X_s^r$, s=1, 2, . . . $N_s$) and corresponding localization parameters ($LP_s^l$, $LP_s^r$, s=1, 2, . . . $N_s$) based on a number of electric input signals (INm1, INm2, INw) from the input unit (IU), each electric input signal representing a sound or audio signal. In the present embodiment, the electric input signals (INm1, INm2) are signals from two microphones ($mic_{l1}$, $mic_{l2}$ and $mic_{r1}$, $mic_{r2}$ of the left and right hearing instruments, respectively) and (INw) from a wireless receiver comprising antenna (ANT) and transceiver circuitry (RF-Rx/Tx-l and RF-Rx/Tx-r of the left and right instruments, respectively). The forward path further comprises a selector and mixer unit (SEL-MIX-HRTF) for selecting a given source signal ($X_s^l$, $X_s^r$, s=1, 2, . . . $N_s$) or mixing a number of source signals and providing a resulting input signal IN to the signal processing unit (SPU). The hearing instruments further comprises a memory ($HRTF_l$, $HRTF_r$) for storing a database of head related transfer functions HRTF and a calculation and comparator unit (COMP) for determining a HRTF of a current sound source $S_s$ (from the currently received separated sound source signals $X_s^l$ and $X_s^r$, of the left and right hearing instruments, respectively) and comparing such current values with values stored in the database. The calculation and comparator unit (COMP) is configured to update the corresponding HRTF-value of the database according to a predefined learning rule (e.g. controlled via a control signal crit from the signal processing unit SPU). The selector and mixer unit (SEL-MIX-HRTF) is configured to access the memory ($HRTF_l$, $HRTF_r$) and to apply an appropriate HRTF to a currently received sound source signal (e.g. only to a signal selected for further processing), cf. signal $hrtf_l$ and $hrtf_r$ in the left and right hearing instruments, respectively. In the binaural hearing assistance system of FIG. 3B, signals $X_s^r$, $LP_s^r$ and signals $X_s^l$, $LP_s^l$ are transmitted via bi-directional wireless link IA-WL from the right to the left and from the left to the right hearing instruments, respectively. These signals are received and extracted by the respective antenna (ANT) and transceiver circuitry (IA-Rx/Tx-l and IA-Rx/Tx-r) and forwarded to the respective signal processing units (SPU) of the opposite hearing instrument as signals DBS. The source signal and localization data ($X_s^l$, $LP_s^l$) received in the right hearing instrument ($HAD_r$) from the left hearing instrument ($HAD_l$) can be forwarded from the signal processing unit (SPU) to the HRTF-database ($HRTF_r$) of the right hearing instrument ($HAD_r$) via signal dbs. Likewise, source signal and localization data ($X_s^r$, $LP_s^r$) can be extracted from the HRTF-database ($HRTF_r$) of the right hearing instrument ($HAD_r$) and forwarded to the left hearing instrument ($HAD_l$) via signal dbs, signal processing unit SPU, signal DBS, antenna and transceiver circuitry (IA-Rx/Tx-r) of the right hearing instrument and wireless link IA-WL. The source signal and/or localization parameters from the local and the opposite hearing instrument can be used together to update the respective HRTF-databases and to apply localization cues provided by the relevant HRFT-values for the selected resulting input signal(s) in the left and right hearing instruments. Each (or one of the) hearing instruments comprises a manually operable and/or a remotely operable user interface (UI) for generating a control signal UC, e.g. for providing a user input to one or more or the signal processing unit (SPU), the HRTF-database ($HRTF_l$, $HRTF_r$), the selector and mixer unit (SEL-MIX-HRTF) and the separation and localization unit (SEP-LOC) (e.g. for selecting a target signal among a number of signals in the sound field picked up by the input unit (IU)). In an embodiment, a given sound source can be 'relocated' via the user interface, so that it is perceived as originating at a location determined by the user, such location possibly being virtual (e.g. allocated to a directly received audio input signal) and/or deviating from the physical location of the sound source as determined by the separation and localization unit (SEP-LOC) (e.g. originating from a speaker in the environment of the user). Such user interface is discussed in connection with FIG. 4.

Figure 4:
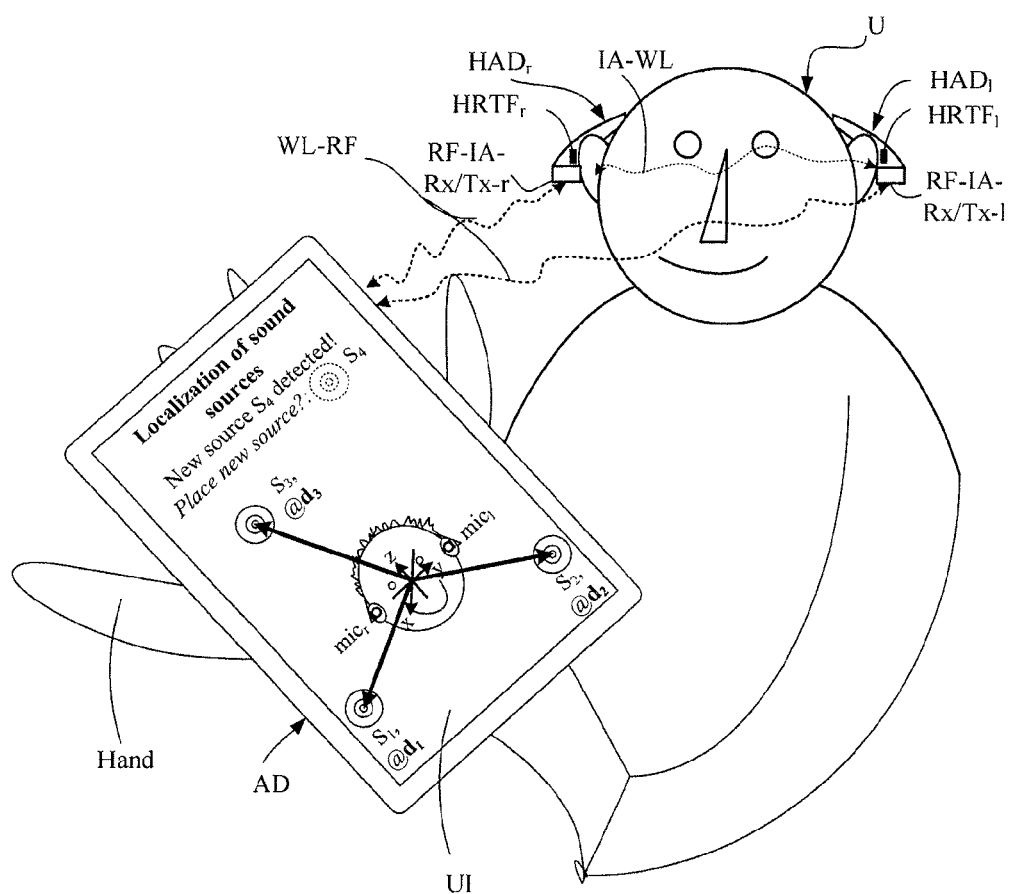
FIG. 4 shows an embodiment of a binaural hearing assistance system comprising left and right hearing assistance devices and an auxiliary device, e.g. a cellphone, the auxiliary device comprising a user interface for the system, e.g. for viewing and (possibly) influencing the (perceived) location of current sound sources in the environment of the binaural hearing assistance system.

FIG. 4 shows an embodiment of a binaural hearing assistance system comprising left and right hearing assistance devices ($HAD_l$, $HAD_r$) and an auxiliary device (AD), e.g. a cellphone, the auxiliary device comprising a user interface (UI) for the system, e.g. for viewing and (possibly) influencing the (perceived) location of current sound sources ($S_s$) in the environment of the binaural hearing assistance system.

The left and right hearing assistance devices ($HAD_l$, $HAD_r$) are e.g. implemented as described in connection with FIG. 3. In the embodiment of FIG. 4, the binaural hearing assistance system comprises an auxiliary device (AD) in the form of or comprising a cellphone, e.g. a SmartPhone. The left and right hearing assistance devices ($HAD_l$, $HAD_r$) and the auxiliary device (AD) each comprise relevant antenna and transceiver circuitry for establishing wireless communication links between the hearing assistance devices (link IA-WL) as well as between at least one of or each of the hearing assistance devices and the auxiliary device (link WL-RF). The antenna and transceiver circuitry in each of the left and right hearing assistance devices necessary for establishing the two links is denoted RF-IA-RX/Tx-l, and RF-IA-RX/Tx-r, respectively, in FIG. 4. Each of the left and right hearing assistance devices ($HAD_l$, $HAD_r$) comprises a respective database of head related transfer functions ($HRTF_l$, $HRTF_r$). In an embodiment, the interaural link IA-WL is based on near-field communication (e.g. on inductive coupling), but may alternatively be based on radiated fields (e.g. according to the Bluetooth standard, and/or be based on audio transmission utilizing the Bluetooth Low Energy standard). In an embodiment, the link WL-RF between the auxiliary device and the hearing assistance devices is based on radiated fields (e.g. according to the Bluetooth standard, and/or based on audio transmission utilizing the Bluetooth Low Energy standard), but may alternatively be based on near-field communication (e.g. on inductive coupling). The bandwidth of the links (IA-WL, WL-RF) is preferably adapted to allow sound source signals (or at least parts thereof, e.g. selected frequency bands and/or time segments) and/or localization parameters identifying a current location of a sound source to be transferred between the devices. In an embodiment, processing of the system (e.g. sound source separation) and/or the function of a remote control is fully or partially implemented in the auxiliary device AD (SmartPhone). In an embodiment, the user interface UI is implemented by the SmartPhone possibly running an APP allowing to control the functionality of the audio processing device via the SmartPhone, e.g. utilizing a display of the SmartPhone to implement a graphical interface (e.g. combined with text entry options).

In an embodiment, the binaural hearing assistance system is configured to allow a user to modify a location of a sound source whose location has been determined by the source separation unit (or received separately for a wirelessly received direct electric signal) via the user interface and to apply the HRTF values to the sound source signal, the HRTF values being extracted from the HRTF database corresponding to the modified location of the sound source. As illustrated in FIG. 4, a location of the sound sources as defined by the separation and localization unit may be displayed by the user interface (UI) of the SmartPhone (which is convenient for viewing and interaction via a touch sensitive display, when the Smartphone is held in a hand (Hand) of the user (U)). The sound sources $S_s$ displayed by the user interface may e.g. be limited by a, e.g. user defined, criterion, e.g. including all detected, or the currently loudest, or those currently containing speech, and/or those currently containing music, or those currently containing noise (e.g. uncorrelated sound, and/or sound identified not to be speech and not to be music), etc. In the illustrated example in FIG. 4, the locality of 3 sound sources $S_1$, $S_2$ and $S_3$ (as represented by respective vectors $d_1$, $d_2$, and $d_3$ in the indicated orthogonal coordinate system (x, y, z) having its center between the respective microphone units ($mic_l$, $mic_r$) of the left and right hearing assistance devices) are displayed relative to the user (U). In the example of FIG. 4, a new sound source $S_4$ has been detected (e.g. a wirelessly received direct electric audio signal source), and the user interface UI is configured to allow the user to spatially place the new source in the current sound source arrangement according to wish (e.g. by dragging the source symbol to the left of text indication '$S_4$' and dropping it at an appropriate location relative to the user). The binaural hearing assistance system (including the auxiliary device) is configured to determine and transmit localization parameters $LP_4$ corresponding to the location of $S_4$ as proposed by the user via the user interface to the left and right hearing assistance devices ($HAD_l$, $HAD_r$) of the binaural hearing assistance system. The binaural hearing assistance system (including the left and right hearing assistance devices) is adapted to receive the localization parameters $LP_4$ and to apply corresponding head related transfer functions HRTF ($HRTF_l(LP_4)$, $HRTF_r(LP_4)$) to the sound source signal $S_4$ in the left and right hearing assistance devices, respectively. Additionally, the user is allowed to manipulate the sound field by placing one or more sound sources at another position than its/their physical (or otherwise proposed) location.

Various aspects of inductive communication links (IA-WL) are e.g. discussed in EP 1 107 472 A2, EP 1 777 644 A1, US 2005/0110700 A1, and US2011222621A1. WO 2005/055654 and WO 2005/053179 describe various aspects of a hearing aid comprising an induction coil for inductive communication with other units. A protocol for use in an inductive communication link is e.g. described in US 2005/0255843 A1.

In an embodiment, the RF-communication link (WL-RF) is based on classic Bluetooth as specified by the Bluetooth Special Interest Group (SIG) (cf. e.g. https://www.bluetooth.org). In an embodiment, the (second) RF-communication link is based other standard or proprietary protocols (e.g. a modified version of Bluetooth, e.g. Bluetooth Low Energy modified to comprise an audio layer).

Figure 5:
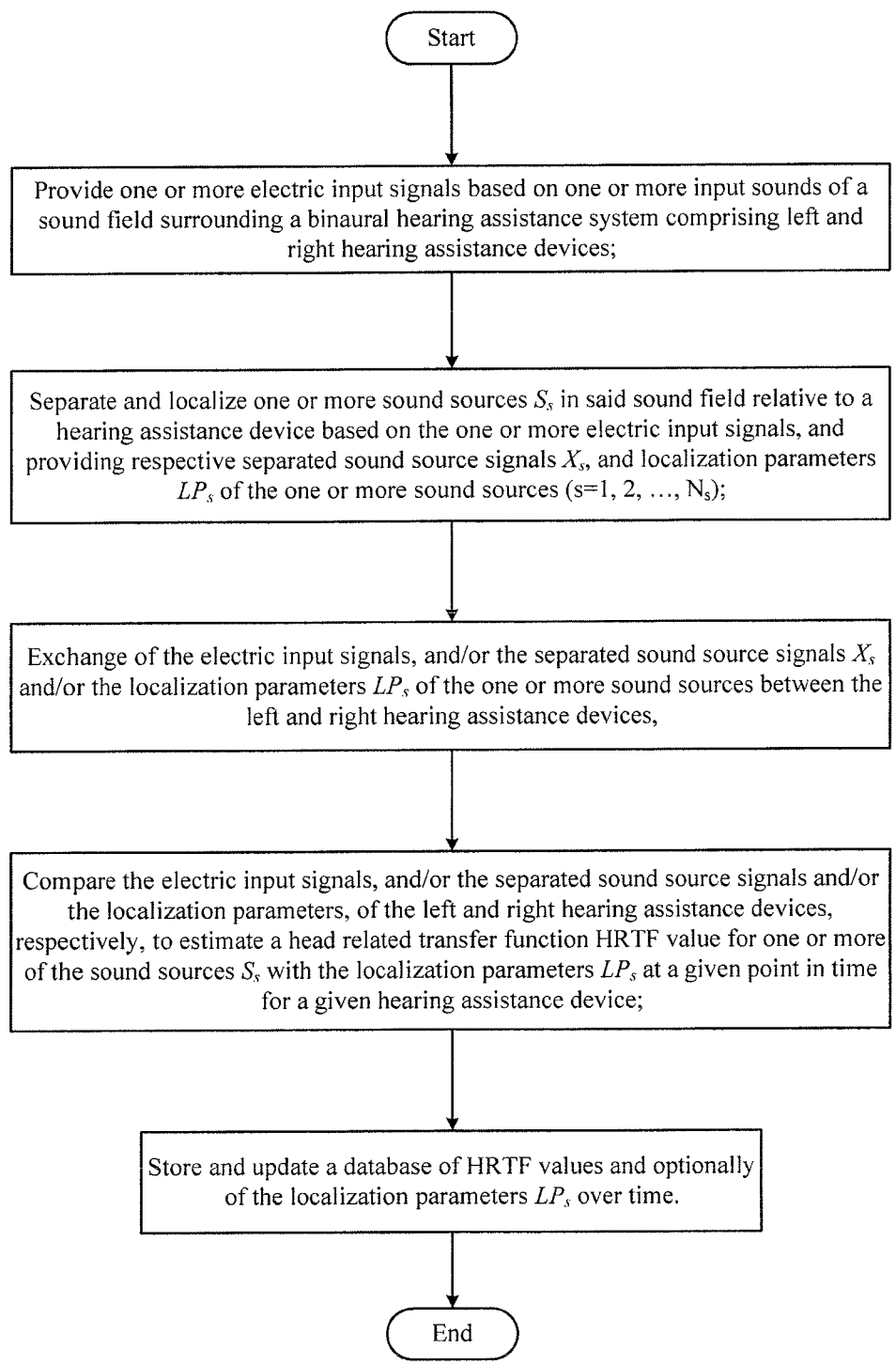
FIG. 5 shows a flow diagram of a method of operating a hearing assistance system (as e.g. shown in FIG. 3) comprising left and right hearing assistance devices.

FIG. 5 shows a flow diagram of a method of operating a hearing assistance system (as e.g. shown in FIG. 3) comprising left and right hearing assistance devices. The method comprises in each of the left and right hearing assistance devices the steps shown in FIG. 5.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims and equivalents thereof.

REFERENCES

[Gardner and Martin, 1994] Gardner, Bill and Martin, Kieth, *HRTF Measurements of a KEMAR Dummy-Head Microphone*, MIT Media Lab Machine Listening Group, MA, US, 1994.
[Dillon; 2001] Dillon H. (2001), Hearing Aids, Thieme, New York-Stuttgart, 2001.
WO2010115227A1 (COCHLEAR) 14 Oct. 2010
US2004218771A1 (SAT) 4 Nov. 2004
WO2009001277A1 (PHILIPS) 31 Dec. 2008
EP2563045A1 (OTICON) 27 Feb. 2013
[Schaub; 2008] Arthur Schaub, Digital hearing Aids, Thieme Medical. Pub., 2008.
EP1107472A2 (SONY) 13 Jun. 2001
EP1777644A1 (OTICON) 24 May 2007
US20050110700A1 (STARKEY/OTICON) 26 May 2005
US2011222621A1 (OTICON) 15 Sep. 2011
WO2005055654 (STARKEY/OTICON) 16 Jun. 2005
WO2005053179 (STARKEY/OTICON) 9 Jun. 2005
US20050255843A1 (STARKEY/OTICON) 17 Nov. 2005

The invention claimed is:

1. A non-transitory storage medium storing a processor-executable program that, when executed by a processor of an auxiliary device, implements a user interface process for a binaural hearing assistance system including left and right hearing assistance devices, the process comprising:
    exchanging information with the left and right hearing assistance devices;
    providing a graphical interface configured to illustrate one or more currently active sound sources relative to the user; and
    executing, based on input from a user via the user interface, at least one of:
        modifying a location of a sound source, the location of the sound source having been determined by source separation; and placing a sound source for a wirelessly received direct electric signal at an appropriate location relative to the user.

2. The non-transitory storage medium according to claim 1, wherein the user interface is configured to allow a user to select a suitable position of a sound source relative to the user.

3. The non-transitory storage medium according to claim 2, wherein the process further comprises:
updating localization parameters of a sound source in a memory unit of the left and right hearing assistance devices, based on user input to the user interface.

4. The non-transitory storage medium according to claim 1, the process further comprising:
allowing a user, based on user input to the user interface, to select a particular sound source signal to be included in an output signal from at least one of the hearing assistance devices to the user.

5. The non-transitory storage medium according to claim 1, the process further comprising:
extracting localization parameters that represent perceived location of a specific sound.

6. The non-transitory storage medium according to claim 1, the process further comprising:
extracting localization parameters embedded in an audio signal representing a sound source signal.

7. The non-transitory storage medium according to claim 1, wherein sound sources displayed by the user interface are limited by a user defined criterion.

8. The non-transitory storage medium according to claim 7 wherein the user define criterion comprises one of the following options:
include all detected sound sources,
include the currently loudest sound sources,
include the sound sources currently containing speech,
include the sound sources currently containing music,
include the sound sources currently containing noise
include the sound sources currently containing uncorrelated sound,
include the sound source identified not to be speech and not to be music,
or a mixture thereof.

9. The non-transitory storage medium according to claim 1, wherein the user interface is configured to allow the user, based on input to the user interface, to spatially place a new source in the current sound source arrangement by dragging a sound source symbol from a current location and dropping it at an appropriate location relative to the user.

10. The non-transitory storage medium according to claim 1, the process further comprising:
determining and transmitting localization parameters corresponding to the location of a sound source as proposed by the user via the user interface to the left and right hearing assistance devices of the binaural hearing assistance system.

11. An auxiliary device comprising:
a user interface for a binaural hearing assistance system that includes left and right hearing assistance devices adapted for being located at or in a left and right ear, respectively, of a user, wherein
the user interface generates a graphical interface configured to illustrate a currently active sound source relative to the user, and, based on input from the user via the user interface, allowing a user to perform at least one of:
modifying a location of a sound source, the location of the sound source having been determined by source separation; and
placing a sound source for a wirelessly received direct electric signal at an appropriate location relative to the user.

12. The auxiliary device according to claim 11, wherein said auxiliary device is a remote control or a smartphone.

13. The auxiliary device according to claim 12, wherein the user interface is a remote control or smartphone executing a software program.

14. The auxiliary device according to claim 11, wherein the device is configured to establish a communication link with the left and right hearing assistance devices to exchange information with the left and right hearing assistance devices.

15. The auxiliary device according to claim 11, further comprising:
a localization unit, which estimates the position of a sound source by means other than the sound signal.

16. The auxiliary device according to claim 11, further comprising:
an antenna and transceiver for receiving a signal comprising localization parameters.

17. An auxiliary device configured to execute a program to implement a user interface process for a binaural hearing assistance system including left and right hearing assistance devices, the process comprising:
exchanging information with the left and right hearing assistance devices;
providing a graphical interface configured to illustrate one or more currently active sound sources relative to the user; and
executing, based on input from a user via the user interface, at least one of:
modifying a location of a sound source, the location of the sound source having been determined by source separation; and
placing a sound source for a wirelessly received direct electric signal at an appropriate location relative to the user.

18. A binaural hearing assistance system, comprising:
left and right hearing assistance devices adapted for being located at or in a left and right ear, respectively, of a user, each of the left and right hearing assistance devices, comprising:
an input unit for providing one or more electric input signals based on one or more input sounds of a sound field surrounding the binaural hearing assistance system,
a signal processing unit for processing an input signal selected among said electric input signals, or a mixture thereof, and providing a processed output signal, and
an output unit for providing output stimuli to the user based on the processed signal, wherein said output stimuli are perceived by the user as sound; and
an auxiliary device according to claim 11.

19. The binaural hearing assistance system according to claim 18, wherein the auxiliary device receives localization parameters and applies corresponding head related transfer functions (HRTF) to a selected sound source signal in the left and right hearing assistance devices, respectively.

20. The binaural hearing assistance system according to claim 18, wherein the auxiliary device applies hear related transfer functions (HRTF) values to a sound source signal whose location has been modified via the user interface, the HRTF values being extracted from a HRTF database corresponding to a modified location of the sound source.

21. The binaural hearing assistance system according to claim 18, wherein the auxiliary device allows the user to manipulate the sound field by placing one or more sound sources at a position other than its/their physical or otherwise proposed location.

22. The binaural hearing assistance system according to claim 18, wherein the auxiliary device allows a user to relocate a sound source via the user interface of the auxiliary device, so that the sound source is perceived as originating at a location determined by the user.

23. A method for implementing a user interface on an auxiliary device for a binaural hearing assistance system including left and right hearing assistance devices, the method comprising:
   exchanging information with the left and right hearing assistance devices;
   providing a graphical interface configured to illustrate one or more currently active sound sources relative to the user; and
   executing, based on input from a user via the user interface, at least one of:
      modifying a location of a sound source, the location of the sound source having been determined by source separation; and
      placing a sound source for a wirelessly received direct electric signal at an appropriate location relative to the user.

* * * * *